(12) United States Patent
Faber et al.

(10) Patent No.: US 12,173,796 B2
(45) Date of Patent: Dec. 24, 2024

(54) KIT FOR PROTECTING AT LEAST ONE SEAL INSTALLED IN A TRANSFER FUEL PUMP

(71) Applicant: DELPHI TECHNOLOGIES IP LIMITED, St. Michael (BB)

(72) Inventors: Guillaume Faber, Blois (FR); Ludovic Breton, Saunay (FR)

(73) Assignee: PHINIA JERSEY HOLDINGS LLC, Wilmington, DE (US)

( * ) Notice: Subject to any disclaimer, the term of this patent is extended or adjusted under 35 U.S.C. 154(b) by 0 days.

(21) Appl. No.: 18/266,450

(22) PCT Filed: Dec. 8, 2021

(86) PCT No.: PCT/EP2021/084812
§ 371 (c)(1),
(2) Date: Jun. 9, 2023

(87) PCT Pub. No.: WO2022/122829
PCT Pub. Date: Jun. 16, 2022

(65) Prior Publication Data
US 2024/0044406 A1    Feb. 8, 2024

(30) Foreign Application Priority Data

Dec. 9, 2020    (GB) ...................................... 2019415

(51) Int. Cl.
*F16J 15/16*    (2006.01)
*B25B 27/00*    (2006.01)
(Continued)

(52) U.S. Cl.
CPC ........... *F16J 15/16* (2013.01); *B25B 27/0028* (2013.01); *F02M 59/48* (2013.01); *F02M 2200/16* (2013.01); *F04B 1/0448* (2013.01)

(58) Field of Classification Search
CPC .. B25B 27/0028; F16J 15/3268; F02M 59/48; F02M 2200/16; F02M 2200/80; F02M 2200/8023; F04B 1/0448
See application file for complete search history.

(56) References Cited

U.S. PATENT DOCUMENTS 3,233,313 A * 2/1966 Roth ....................... B25B 27/10
                                                              81/302
4,218,813 A * 8/1980 Cather, Jr. .......... B25B 27/0028
                                                              29/464

(Continued)

FOREIGN PATENT DOCUMENTS

DE    102012210184 A1    12/2013
EP         2023023 A1     2/2009
(Continued)

OTHER PUBLICATIONS

International Search Report for PCT/EP2021/084812 dated Mar. 21, 2022, 3 pages.
(Continued)

*Primary Examiner* — Nicholas L Foster
(74) *Attorney, Agent, or Firm* — WARNER NORCROSS + JUDD LLP (57) ABSTRACT

A kit for protecting at least one seal installed in a cavity of a transfer fuel pump, the cavity comprising an opening for receiving a shaft inside the cavity. The kit comprises a first tool and a second tool,
the first tool comprising a first handle and a first protective portion,
the second tool comprising a second handle and a second protective portion, and
the first and the second protective portions being shaped to be inserted in the cavity of the transfer fuel pump while receiving the shaft inside said cavity.

11 Claims, 7 Drawing Sheets

(51) Int. Cl.
*F02M 59/48* (2006.01)
*F04B 1/0448* (2020.01)

(56) References Cited

U.S. PATENT DOCUMENTS

| | | | | | |
|---|---|---|---|---|---|
| 4,515,376 | A | * | 5/1985 | Okamuro | F16J 15/3268 29/451 |
| 4,815,884 | A | * | 3/1989 | Halliday, Jr. | B25B 27/0028 403/17 |
| 5,503,404 | A | * | 4/1996 | Newton | B63H 23/321 277/551 |
| 7,651,102 | B2 | * | 1/2010 | Heldmann | F16J 15/3268 29/280 |
| 8,292,302 | B2 | * | 10/2012 | Heldmann | F16J 15/32 277/551 |
| 8,474,828 | B2 | * | 7/2013 | Heldmann | B25B 27/0028 277/551 |
| 8,783,133 | B2 | * | 7/2014 | Pietras | F16J 15/3268 74/609 |
| 8,910,948 | B2 | * | 12/2014 | Heldmann | F16J 15/32 277/551 |
| 10,933,520 | B2 | * | 3/2021 | Muller | F16H 57/029 |
| 11,313,472 | B2 | * | 4/2022 | Arobbio | F16H 57/023 |
| 2005/0258181 | A1 | * | 11/2005 | Heldmann | B25B 27/0028 220/837 |
| 2006/0042063 | A1 | * | 3/2006 | Tally | B25B 27/10 29/237 |
| 2007/0157759 | A1 | * | 7/2007 | Englund | F16H 48/08 74/606 R |
| 2010/0065010 | A1 | | 3/2010 | Abe | |
| 2010/0084417 | A1 | * | 4/2010 | Heldmann | F16J 15/32 220/200 |
| 2011/0179620 | A1 | * | 7/2011 | Harmon | F16J 15/3268 49/463 |
| 2011/0185844 | A1 | * | 8/2011 | Pietras | F16J 15/3268 29/446 |
| 2012/0228834 | A1 | * | 9/2012 | Heldmann | F16J 15/3268 277/551 |
| 2013/0256995 | A1 | * | 10/2013 | Heldmann | F16J 15/32 277/551 |
| 2019/0366520 | A1 | * | 12/2019 | Muller | F16H 57/029 |
| 2020/0393047 | A1 | * | 12/2020 | Arobbio | F16J 15/54 |

FOREIGN PATENT DOCUMENTS

| | | |
|---|---|---|
| JP | H08100797 A | 4/1996 |
| JP | 2004076761 A | 3/2004 |
| JP | 2015169188 A | 9/2015 |

OTHER PUBLICATIONS

Machine assisted English translation of DE102012210184A1 obtained from https://worldwide.espacenet.com/patent on Jun. 7, 2023, 9 pages.
Machine assisted English translation of JP2015169188A obtained from https://worldwide.espacenet.com/patent on Jun. 7, 2023, 6 pages.
Machine assisted English translation of EP2023023A1 obtained from <https://patents.google.com/patent> on Nov. 4, 2024, 11 pages.
Machine assisted English translation of JPH08100797A obtained from https://patents.google.com/patent on Nov. 4, 2024, 4 pages.
Machine assisted English translation of JP2004076761A obtained from https://patents.google.com/patent on Nov. 4, 2024, 5 pages.

* cited by examiner

KIT FOR PROTECTING AT LEAST ONE SEAL INSTALLED IN A TRANSFER FUEL PUMP

CROSS-REFERENCE TO RELATED APPLICATIONS

This application is the U.S. National Stage of International Application No. PCT/EP2021/084812 filed on 8 Dec. 2021, which claims priority to and all advantages of United Kingdom Application No. 2019415.5 filed on 9 Dec. 2020, the contents of which are incorporated herein by reference.

TECHNICAL FIELD

The present invention relates to a kit for protecting at least one seal installed in a cavity of a transfer fuel pump, and an associated method.

BACKGROUND OF THE INVENTION

It is known that a fuel pump, for example a high-pressure direct injection (HDI) diesel fuel pump, is provided with a transfer fuel pump. The transfer fuel pump is crossed by fuel travelling from a fuel tank to a combustion chamber of the vehicle fuel engine. In particular, the transfer fuel pump regulates the amount of fuel arriving into the vehicle fuel engine. The transfer fuel pump further regulates the amount of other fluids, such as oil, that arrives into the vehicle fuel engine.

The transfer fuel pump is provided with a cavity wherein a shaft is installed. The shaft comprises at least one recess shaped to cooperate with a stop ring when the shaft is installed inside the cavity.

In order to avoid fuel or oil leakage from the cavity, at least one seal is installed inside the cavity. In service processes, when the shaft must be replaced by a new one, the at least one seal may be damaged by the at least one recess when the new shaft is introduced in the cavity. The same problem appears when during service processes the shaft must be extracted from and reintroduced in the cavity. In particular, high risks of cutting the seals with the at least one recess exist during the introduction of the shaft in service processes.

SUMMARY OF THE INVENTION

Accordingly, it is an object of the present invention to resolve the above-mentioned problem in providing a kit for protecting at least one seal installed in a cavity of a transfer fuel pump, the cavity comprising an opening for receiving a shaft inside said cavity, the kit comprising a first tool and a second tool,
the first tool comprising a first handle and a first protective portion,
the second tool comprising a second handle and a second protective portion,
the first and the second protective portions being shaped to be inserted in the cavity of the transfer fuel pump while receiving the shaft inside said cavity.

Thanks to the claimed kit, the at least one seal is protected by the first protective portion and the second protective portion during the insertion of the shaft inside the cavity. Then, the risks of damaging the at least one seal in service processes that require a replacement of the shaft by a new one are reduced. Also, the risks of damaging the at least one seal in service processes that require an extraction from and reintroduction in the cavity of the shaft are reduced.

In an embodiment of the kit, the first protective portion and the second protective portion are substantially semi-cylindrical.

In an embodiment of the kit, a first length of the first protective portion and a second length of the second protective portion cover the at least one seal when the first and the second protective portions are inserted in the cavity.

In an embodiment of the kit, a first thickness of the first protective portion and a second thickness of the second protective portion are comprised in a range from 0.1 mm to 1.5 mm, preferably from 0.4 mm to 0.6 mm.

In an embodiment of the kit, the first protective portion comprises a first flat surface and the second protective portion comprises a second flat surface.

In an embodiment of the kit, the first tool further comprises a first link portion, the first link portion being provided between the first handle and the first protective portion, and the second tool further comprises a second link portion, the second link portion being provided between the second handle and the second protective portion.

In an embodiment of the kit, an end of the first flat surface is in an extension of the first link portion, the first flat surface being substantially perpendicular to the first link portion, and the second flat surface is in an extension of the second link portion, the second flat surface being substantially perpendicular to the second link portion.

In an embodiment of the kit, the first link portion is integrally formed with the first handle and the first protective portion, and the second link portion is integrally formed with the second handle and the second protective portion.

In an embodiment of the kit, the first tool and the second tool are made of steel.

The invention further extends to a method for protecting at least one seal installed in a cavity of a transfer fuel pump by means of the kit as previously described, the cavity comprising an opening for receiving a shaft inside said cavity, the shaft comprising at least one annular groove, the method comprising the steps of:
a) introducing the first protective portion and the second protective portion in the cavity;
b) inserting the shaft inside the cavity until the at least one annular groove overtakes the at least one seal;
c) applying a pulling force to the first handle of the first tool and to the second handle of the second tool until extraction of the first protective portion and the second protective portion from the cavity; and
d) during step c) applying a swinging movement to the first tool and the second tool.

In the method as previously described, the introduction of the first protective portion and the second protective portion inside the cavity increases an initial internal diameter of the at least one seal.

In the method as previously described, the first protective portion and the second protective portion cover the at least one seal while inserting the shaft inside the cavity.

BRIEF DESCRIPTION OF THE DRAWINGS

The present invention is now described by way of example with reference to the accompanying drawings in which.

DESCRIPTION OF THE PREFERRED EMBODIMENTS

Figure 1:
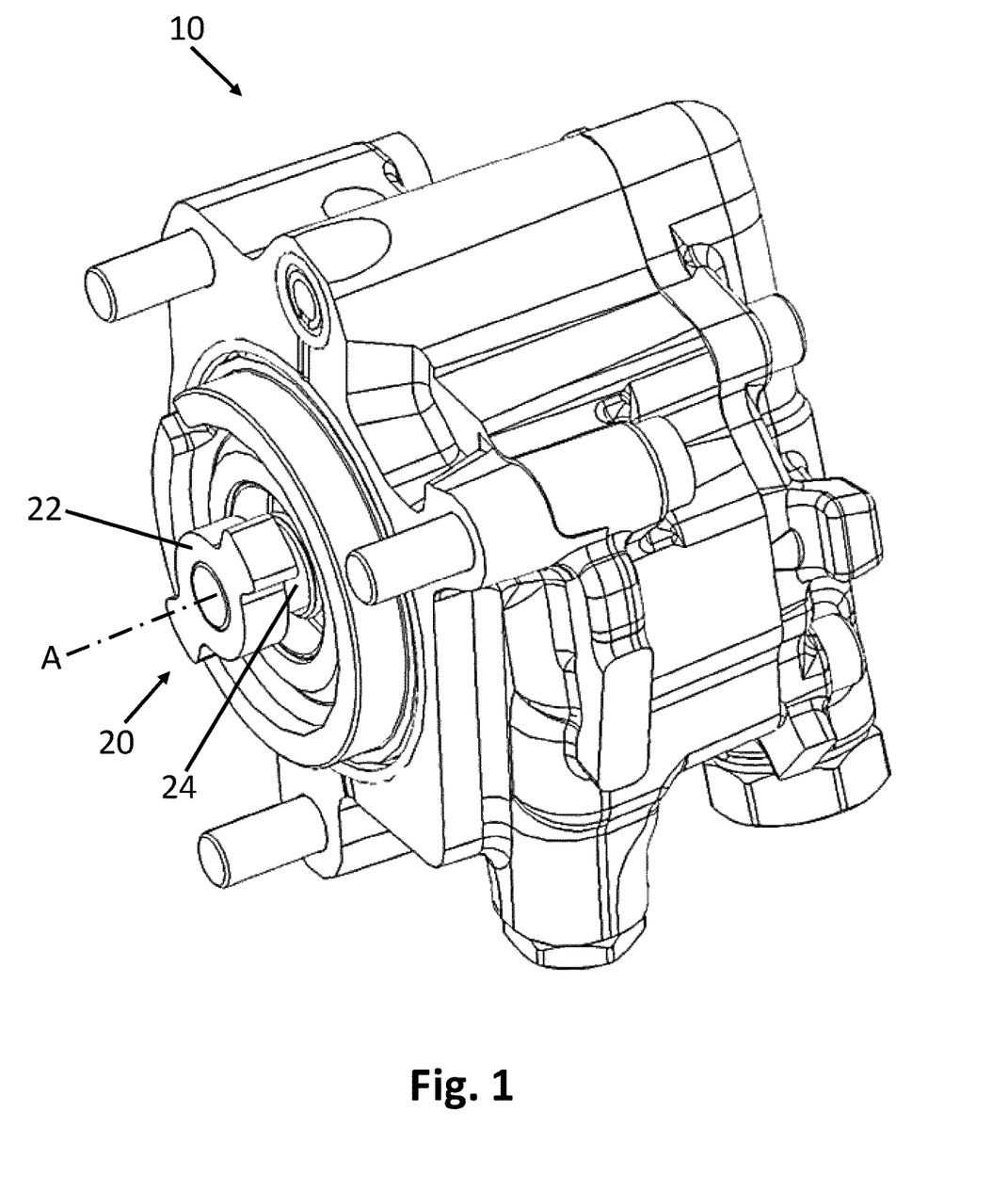
FIG. 1 shows a perspective view of an example of a transfer fuel pump comprising a shaft installed in a cavity.
Figure 2:
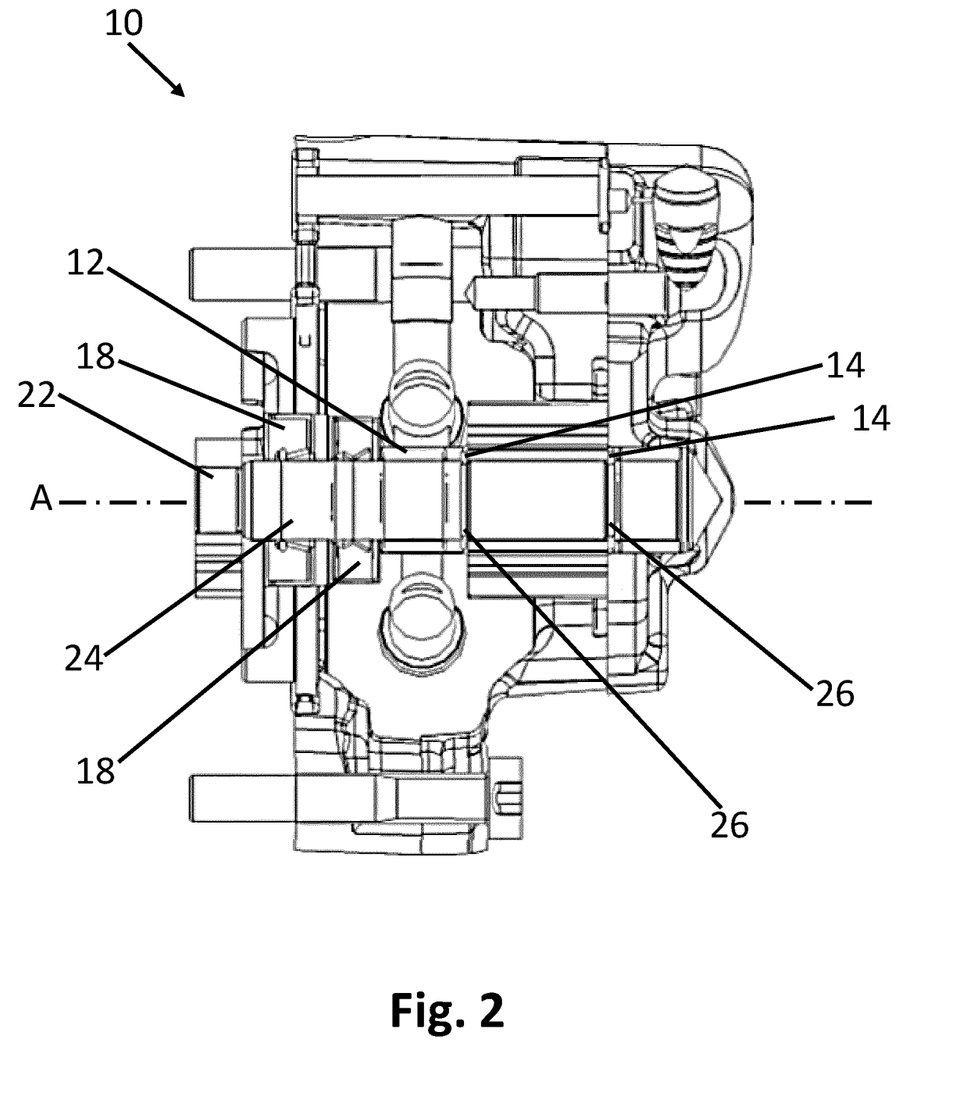
FIG. 2 shows a schematic view of a longitudinal section of the transfer fuel pump of FIG. 1.
Figure 3:
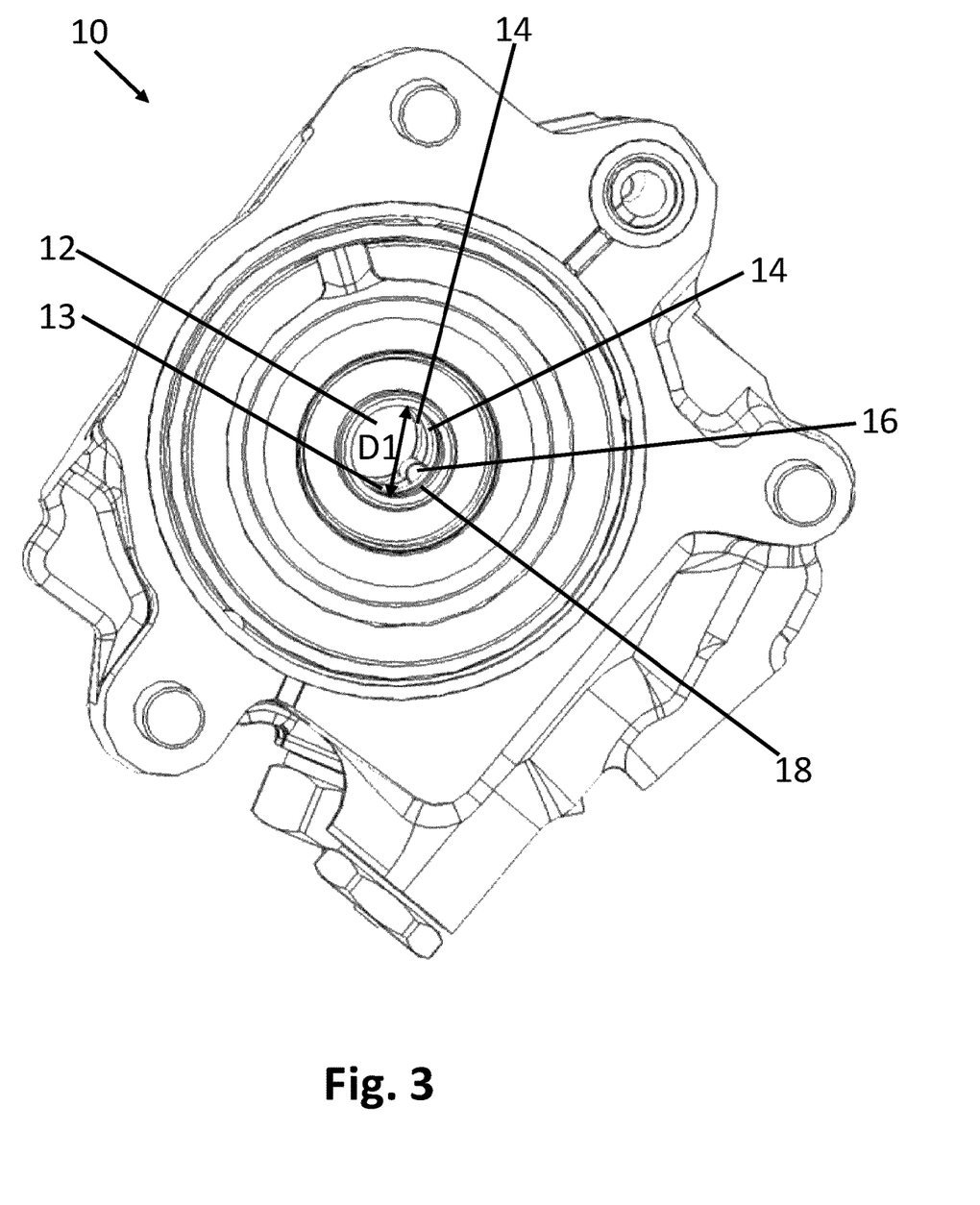
FIG. 3 shows a lateral view of the transfer fuel pump of FIG. 1, wherein the shaft is removed from the cavity.

FIGS. 1 to 3 show an example of transfer fuel pump 10. The transfer fuel pump 10 comprises a cavity 12 clearly shown in FIGS. 2 and 3. A shape and a dimension of the cavity 12 are specific to a model of transfer fuel pump 10. The cavity 12 has for example a substantially cylindrical shape. The cavity 12 extends advantageously in a longitudinal direction A. The cavity 12 is delimited by a lateral wall 13. The cavity 12 is for example a blind cavity. The expression "blind cavity" is understood as a cavity having only an opening. A shape and a dimension of a cross-section of the cavity 12 are specific to the model of transfer fuel pump 10. In the example of FIG. 3, the cavity 12 has a substantially circular cross-section. The substantially circular cross-section of the cavity 12 has a diameter D1.

At least one stop ring 14 and at least one cotter 16 are provided inside the cavity 12. In the example of FIG. 3, two stop rings 14 and one cotter 16 are shown, but any other number of stop rings 14 and cotters 16 is possible. The at least one stop ring 14 and the at least one cotter 16 are installed on the lateral wall 13.

The at least one stop ring 14 has for example a substantially annular shape. Advantageously, an external diameter of the at least one stop ring 14 is substantially equal to the diameter D1.

The at least one cotter 16 has for example an elongated shape. The at least one cotter 16 is preferably installed on the lateral wall 13 following the longitudinal direction A.

The cavity 12 further comprises at least one seal 18. Advantageously, the at least one seal 18 has a substantially annular shape having an initial internal diameter and an external diameter. Preferably, a perimeter of the at least one seal 18 has a shape and a dimension substantially equal to the shape and dimension of the cross-section of the cavity 12. The at least one seal 18 comprises for example a metallic part covered by a deformable material. Alternatively, the at least one seal 18 is exclusively made of the deformable material. For example, the deformable material is rubber.

The at least one seal 18 is installed on the lateral wall 13. Preferably, the at least one seal 18 is placed closer to the opening of the cavity 12 than the at least one stop ring 14 and the at least one cotter 16. The cavity 12 may for example comprise a first seal 18 placed at the opening of the cavity 12, and a second seal 18 placed between the opening of the cavity 12 and the at least one stop ring 14.

As shown in FIG. 1, a shaft 20 is received in the cavity 12. In particular, the shaft 20 is introduced through the opening of the cavity 12. As clearly shown in FIG. 4, the shaft comprises a handle 22 and a rod 24. Advantageously, a shape of the rod 24 is substantially the same than the shape of the cavity 12. A diameter of the rod 24 is advantageously slightly smaller than the diameter D1. The rod 24 further comprises at least one recess 26 and at least one longitudinal groove 28.

Figure 4:
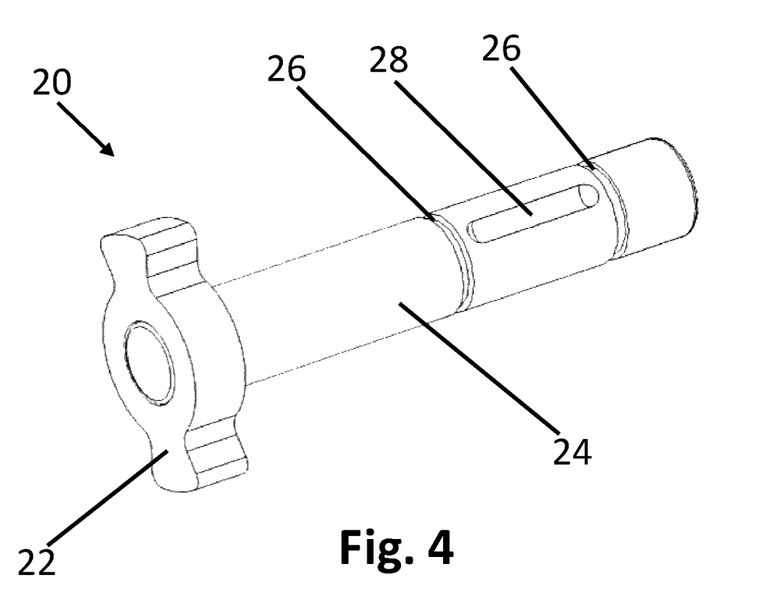
FIG. 4 shows a perspective view of an example of the shaft of the transfer fuel pump of FIG. 1.

The at least one recess 26 extends over a perimeter of the rod 24. In particular, the at least one recess 26 is shaped to receive the at least one stop ring 14 when the shaft is installed in a final position inside the cavity 12. Advantageously, a number of recesses 26 is equal to the number of stop rings 14 in the cavity 12.

The at least one longitudinal groove 28 is shaped to receive the at least one cotter 16 when the shaft is installed in the final position inside the cavity 12. Advantageously, a number of longitudinal grooves 28 is equal to the number of cotters 16 in the cavity 12.

During service processes of the transfer fuel pump, as for example repairing or maintenance processes, when the shaft 20 must be reintroduced in the cavity 12, or when the shaft 20 must be replaced by a new shaft 20, the at least one seal 18 risks of being damaged. In particular, a friction between the at least one seal 18 and edges of the at least one recess 26 exists. The friction may cause damages or even tear of the at least one seal 18.

Figure 5:
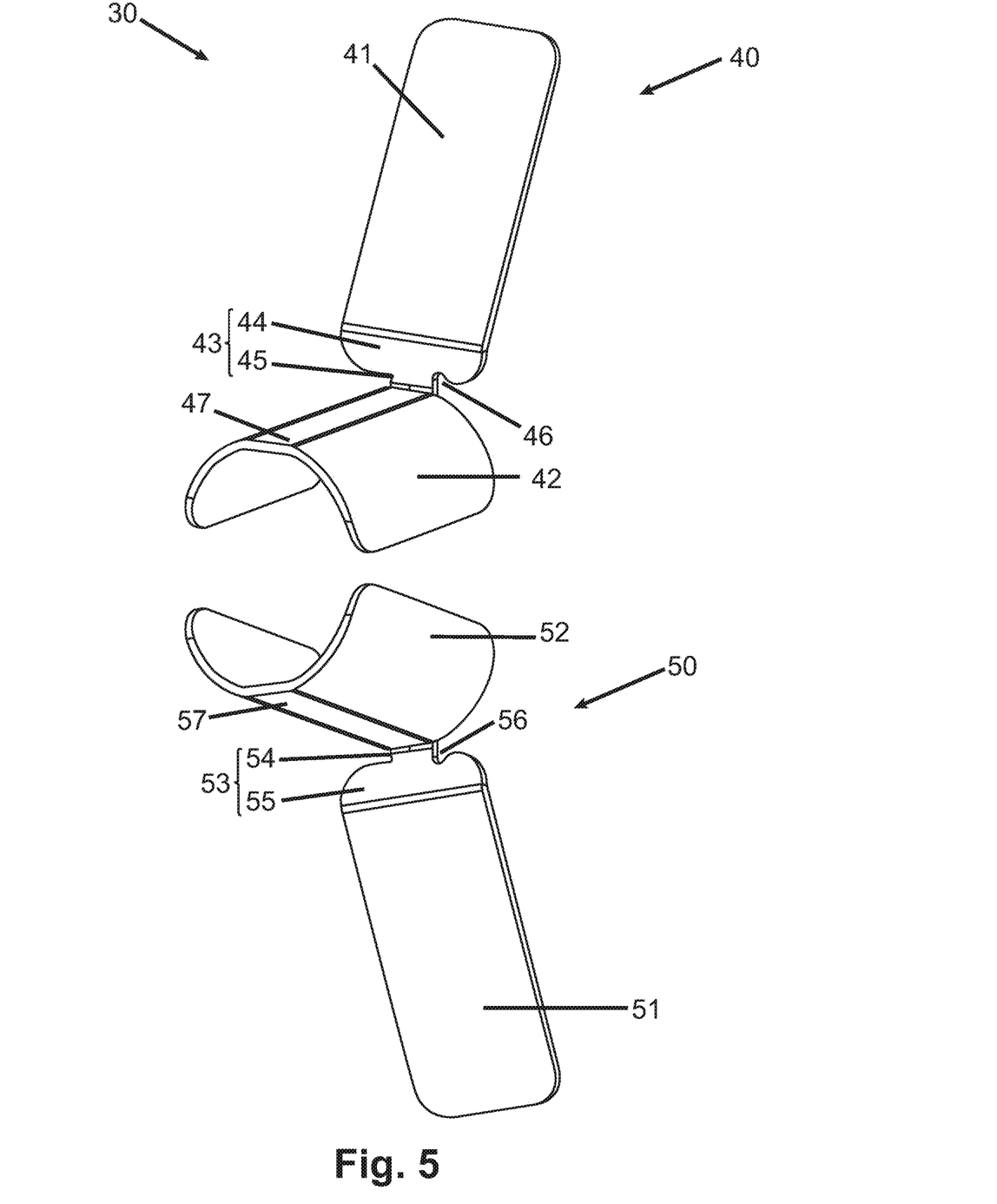
FIG. 5 shows a perspective view of a kit as per the present invention for protecting at least one seal installed in the cavity of the transfer fuel pump of FIG. 1.

In order to avoid friction between the at least one seal 18 and the at least one recess 26, the present disclosure provides a kit 30 for protecting the at least one seal 18. As shown in FIG. 5, the kit 30 comprises a first tool 40 and a second tool 50.

The first tool 40 comprises a first handle 41 and a first protective portion 42. The first tool 40 further comprises a first link portion 43.

The first handle 41 is formed by a flat area. The first handle 41 has a length and a width allowing a user of the kit 30 to place at least a fingertip on the first handle 41. The length of the first handle 41 is for example comprised in a range from 10 mm to 30 mm, preferably from 15 mm to 25 mm. The width of the first handle 41 is for example comprised in a range from 8 mm to 20 mm, preferably from 10 mm to 15 mm.

The first link portion 43 is provided between the handle 41 and the first protective portion 42. The first link portion 43 and the first handle 41 form a first angle $\alpha 1$, clearly shown in FIG. 7. Advantageously, the first angle $\alpha 1$ is comprised in a range from 120° to 170°, preferably from 140° to 160°.

Figure 8:
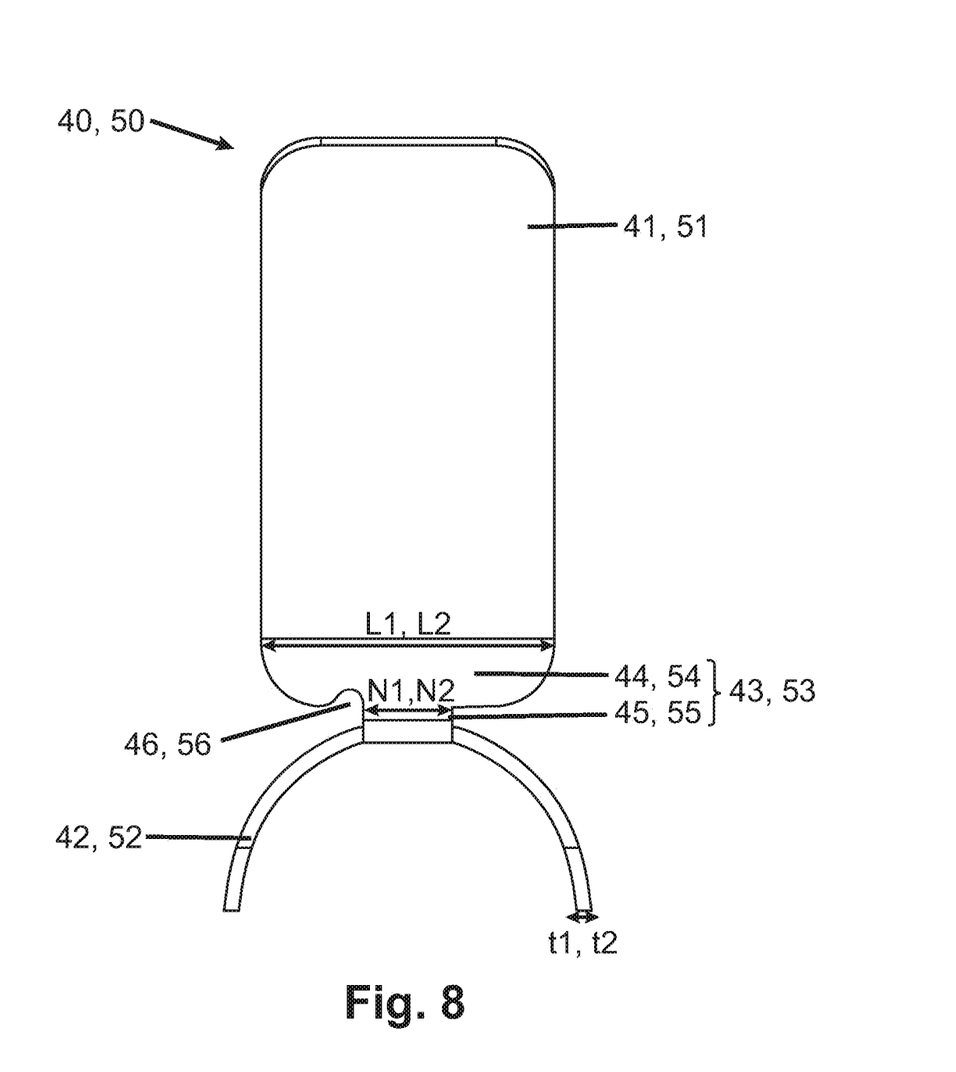
FIG. 8 shows a schematic dorsal view of the tool of FIG. 6.

As best shown in FIGS. 5 and 8, the first link portion 43 comprises a first large part 44 and a first narrow part 45. The first large part 44 is connected to the first handle 41. A width L1 of the first large part 44 is substantially equal to the width of the first handle 41. A length of the first large part 44 is for example comprised in a range from 1.5 mm to 3 mm, preferably from 2 mm to 2.5 mm. A free edge of the first large part 44 comprises a first notch 46. The first notch 46 allows manufacturing tooling to hold the first tool 40 during manufacturing processes of said first tool 40.

The first narrow part 45 is connected to the first protective portion 42. A width N1 of the first narrow part 45 is smaller than the width of the first large part 44. For example, the width N1 of the first narrow part 45 is comprised in a range from 2 mm to 6 mm, preferably from 3 mm to 4 mm. Advantageously, a length of the first large part 44 is shorter that a length of the first narrow part 45. The length of the first narrow part is for example comprised in a range from 0.5 mm to 1.5 mm, preferably between 0.8 mm and 1.2 mm.

Figure 6:
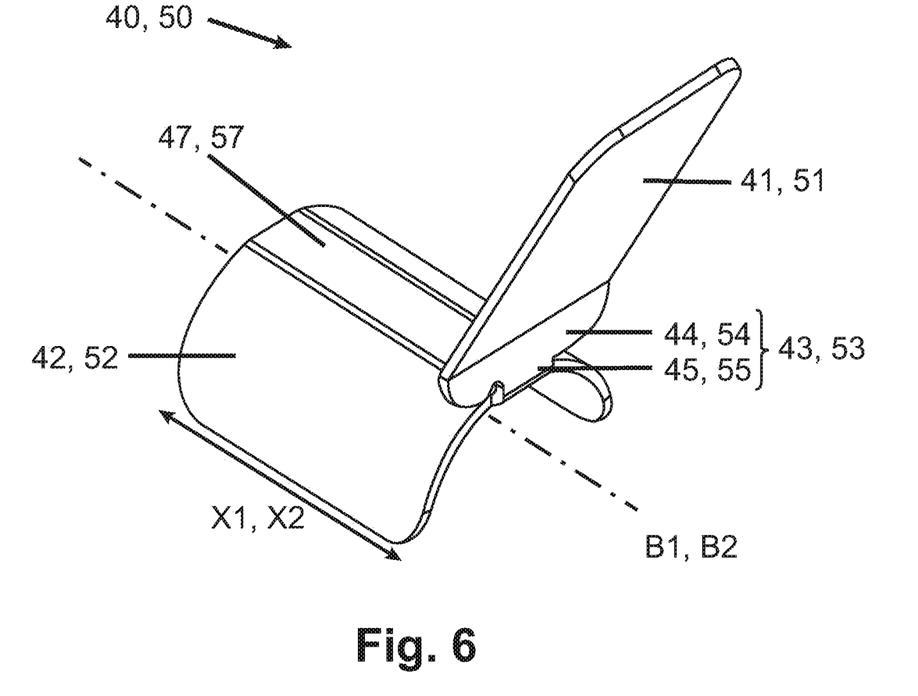
FIG. 6 shows a perspective view of a tool of the kit of FIG. 5.
Figure 7:
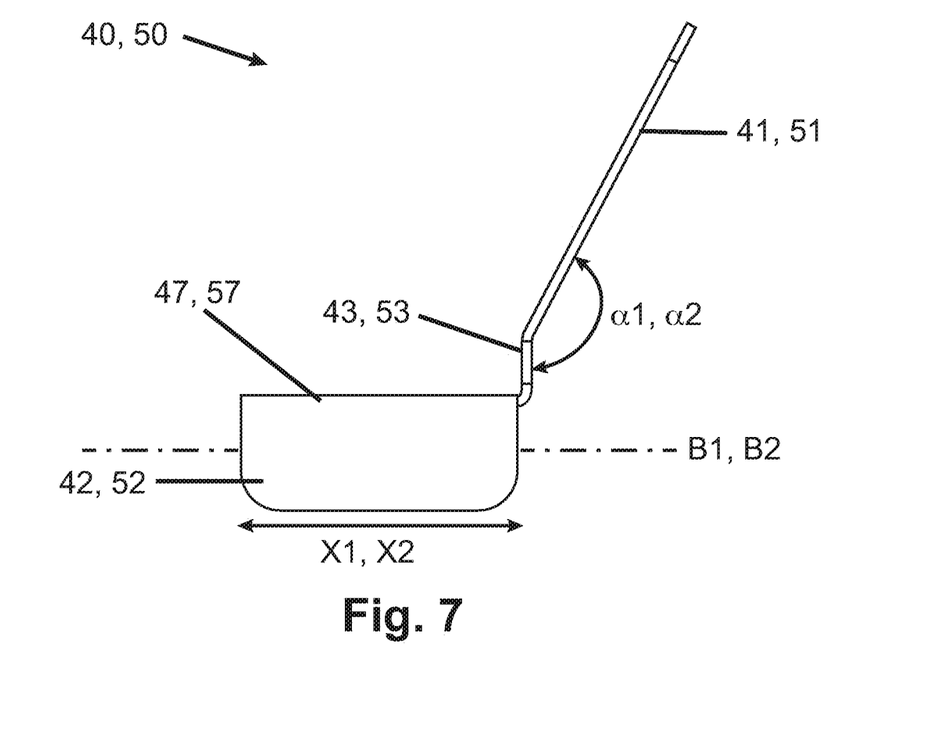
FIG. 7 shows a schematic lateral view of the tool of FIG. 6.

As clearly shown in FIGS. 6 and 7, the first protective portion 42 extends over a first length X1 along a first longitudinal direction B1. The first protective portion 42 is shaped to be inserted in the cavity 12 of the transfer fuel pump 10. The first protective portion 42 has for example a substantially semi-cylindrical shape. When the first protective portion 42 is inserted in the cavity 12, the longitudinal direction B1 is substantially parallel to the longitudinal direction A of the cavity 12. Preferably, a perimeter of the first protective portion is smaller than half the perimeter of the rod 24.

Advantageously, the first protective portion 42 is thin. A first thickness t1 of the first protective portion 42 is for example comprised in a range from 0.1 mm to 1.5 mm, preferably from 0.4 mm to 0.6 mm.

More precisely, the first protective portion 42 is shaped to be inserted in the cavity 12 while the shaft 20 is received inside the cavity 12. In particular, a diameter of the first protective portion 42 is substantially smaller than the diameter D1 of the cavity 12. Advantageously, the diameter of the first protective portion 42 is substantially equal than the diameter of the shaft 20. Alternatively, the diameter of the first protective portion 42 is slightly greater than the diameter of the shaft 20. In other words, a shape and a dimension of the first protective portion 42 allows inserting the first protective portion 42 inside the cavity while allowing the shaft 20 to progress inside said cavity 12.

Advantageously, the first length X1 is equal to or longer than a distance between the opening of the cavity 12 and the at least one seal 18. When several seals 18 are provided in the cavity, the first length X1 is advantageously equal to or longer than a distance between the opening of the cavity 12 and the seal 18 placed in a position furthest from said opening. Then, the first protective portion 42 avoids friction between the at least one seal 18 and the at least one recess 26. The risk of damaging the at least one seal 18 is then reduced.

The first protective portion 42 comprises a first flat surface 47. The first flat surface 47 extends over all the first length X1. The first flat surface 47 is placed at a substantially central zone of the first protective portion 42. In particular, the first flat surface 47 is placed in an extension of the first link portion 43. More precisely, the first flat surface 47 is placed in an extension of the first narrow part 45. Preferably, a width of the first flat surface 47 is substantially equal to the width N1 of the first narrow part Advantageously, the first flat surface 47 is substantially perpendicular to the first link portion 43.

The first protective portion 42 is joined to the first link portion 43 at the first flat surface 47. The first flat surface 47 allows ensuring that the join between the first link portion 43 and the first protective portion 42 is stable and able to stand with tensile and shear stresses that may be exerted while using the kit 30.

Preferably, the first link portion 43 is integrally formed with the first handle 41 and the first protective portion 42. Advantageously, a thickness of the first link portion 43 and a thickness of the first handle 41 are equal to the first thickness t1.

The second tool 50 is structurally equivalent to the first tool 40. In particular, the second tool 50 comprises a second handle 51 and a second protective portion 52. The second tool 50 further comprises a second link portion 53.

The second handle 51 is formed by a flat area. The second handle 51 has a length and a width allowing a user of the kit 30 to place at least a fingertip on the second handle 51. The length of the second handle 51 is for example comprised in a range from 10 mm to 30 mm, preferably from 15 mm to 25 mm. The width of the second handle 51 is for example comprised in a range from 8 mm to 20 mm, preferably from 10 mm to 15 mm.

The second link portion 53 is provided between the second handle 51 and the second protective portion 52. The second link portion 53 and the second handle 51 form a second angle α2, clearly shown in FIG. 8. Advantageously, the second angle α2 is comprised in a range from 120° to 170°, preferably from 140° to 160°.

As best shown in FIGS. 5 and 8, the second link portion 53 comprises a second large part 54 and a second narrow part 55. The second large part 54 is connected to the second handle 51. A width L2 of the second large part 54 is substantially equal to the width of the second handle 51. A length of the second large part 54 is for example comprised in a range from 1.5 mm to 3 mm, preferably from 2 mm to 2.5 mm. A free edge of the second large part 54 comprises a second notch 56. The second notch 56 allows manufacturing tooling to hold the second tool 50 during manufacturing processes of said second tool 50.

The second narrow part 55 is connected to the second protective portion 52. A width N2 of the second narrow part 55 is smaller than the width of the second large part 54. For example, the width N2 of the second narrow part 55 is comprised in a range from 2 mm to 6 mm, preferably from 3 mm to 4 mm. Advantageously, a length of the second large part 54 is shorter that a length of the second narrow part 55. The length of the second narrow part 55 is for example comprised in a range from 0.5 mm to 1.5 mm, preferably between 0.8 mm and 1.2 mm.

As clearly shown in FIGS. 6 and 7, the second protective portion 52 extends over a second length X2 along a second longitudinal direction B2. The second protective portion 52 is shaped to be inserted in the cavity 12 of the transfer fuel pump 10. The second protective portion 52 has for example a substantially semi-cylindrical shape. When the second protective portion 52 is inserted in the cavity 12, the longitudinal direction B2 is substantially parallel to the longitudinal direction A of the cavity 12. Preferably, a perimeter of the second protective portion 52 is smaller than half the perimeter of the rod 24.

Advantageously, the second protective portion 52 is thin. A second thickness t2 of the second protective portion 52 is for example comprised in a range from 0.1 mm to 1.5 mm, preferably from 0.4 mm to 0.6 mm.

More precisely, the second protective portion 52 is shaped to be inserted in the cavity while the shaft 20 is received inside the cavity 12. In particular, a diameter of the second protective portion 52 is smaller than the diameter D1 of the cavity 12. Advantageously, the diameter of the second protective portion 52 is substantially equal than the diameter of the shaft 20. Alternatively, the diameter of the second protective portion 52 is slightly greater than the diameter of the shaft 20. In other words, a shape and a dimension of the second protective portion 52 allows inserting the second protective portion 52 inside the cavity while allowing the shaft 20 to progress inside said cavity 12.

Advantageously, the second length X2 is equal to or longer than a distance between the opening of the cavity 12 and the at least one seal 18. When several seals 18 are provided in the cavity, the second length X2 is advantageously equal to or longer than a distance between the opening of the cavity 12 and the seal 18 placed in a position furthest from said opening. Then, the second protective portion 52 avoids friction between the at least one seal 18 and the at least one recess 26. The risk of damaging the at least one seal 18 is then reduced.

The second protective portion 52 comprises a second flat surface 57. The second flat surface 57 extends over all the second length X2. The second flat surface 57 is placed at a substantially central zone of the second protective portion 52. In particular, the second flat surface 57 is placed in an extension of the second link portion 53. More precisely, the second flat surface 57 is placed in an extension of the second narrow part 55. Preferably, a width of the second flat surface 57 is substantially equal to the width N2 of the second narrow part 55. Advantageously, the second flat surface 57 is substantially perpendicular to the second link portion 53.

The second protective portion 52 is joined to the second link portion 53 at the second flat surface 57. The second flat surface 57 allows ensuring that the join between the second link portion 53 and the second protective portion 52 is stable and able to stand with tensile and shear stresses that may be exerted while using the kit 30.

Preferably, the second link portion 53 is integrally formed with the second handle 51 and the second protective portion 52. Advantageously, a thickness of the second link portion 53 and a thickness of the second handle 51 are equal to the second thickness t2.

Advantageously, the shape and dimensions of the first and the second tools 40, 50 are the same. Alternatively, the first and the second tools 40, 50 can differ in some dimensions. For example, the first tool 40 and the second tool 50 can differ in at least one between:
the first angle α1 and the second angle α2;
the width L1 of the first large part 44 and the width L2 of the second large part 54;
the width N1 of the first narrow part 45 and the width N2 of the second narrow part 55;
the first thickness t1 and the second thickness t2; and
the length X1 of the first protective part 42 and the length X2 of the second protective part 52.

The first tool 40 and the second tool 50 are for example formed from a preformed flat sheet. For example the flat sheet is a metallic flat sheet that is deformed by stamping until acquiring the shape of the first and the second tools 40, 50 previously described. For example, the first and the second tools are made of steel. Preferably, the first and the second tools 40, 50 are made of C35 steel or C45 steel. Advantageously, the steel of the first and the second tools 40, 50 has a Rockwell hardness comprised in a range from 30 HRc to 45 HRc, preferably from 33 HRc to 43 HRc. Steel confers optimal mechanical properties to the first tool 40 and the second tool 50. In addition, steel is not expensive compared to other materials conferring similar mechanical properties.

Alternatively, the first and the second tools 40, 50 are made of polymer or composite materials.

Now, a method for protecting the at least one seal 18 installed in the cavity 12 by means of the kit 30 will be described.

Firstly, the method comprises a step of introducing the first protective portion 42 and the second protective portion 52 in the cavity 12. In particular, the first protective portion 42 and the second protective portion 52 are introduced in the cavity 12 prior to the introduction of the shaft 20. Since the first and the second lengths X1, X2 are equal to or longer than a distance between the opening of the cavity 12 and the at least one seal 18, the first and the second protective portions 42, 52 cover the at least one seal 18. The introduction of the first protective portion 42 and the second protective portion 52 allows deforming the at least one seal 18. In particular, the introduction of the first and the second protective portions 42, 52 inside the cavity 12 increases the initial internal diameter of the at least one seal 18. The initial internal diameter of the at least one seal 18 is increased for example by a value equal to a sum of the first thickness t1 and the second thickness t2. For example, if the first and the second thickness t1, t2 are both equal to 0.5 mm, the initial internal diameter of the at least one seal 18 increases of 1 mm.

The increasing of the initial internal diameter of the at least one seal 18 allows the shaft 20 to be introduced in the cavity 12 even if the first and the second protective portions 42, 52 are inserted in said cavity 12. Therefore, the rod 24 is introduced in the cavity 12 between the first and second protective portions 42, 52.

The first protective portion 42 and the second protective portion 52 cover the at least one seal 18 while inserting the shaft 20 inside the cavity 12. In particular, the first protective portion 42 and the second protective portion 52 are maintained inside the cavity 12 until the at least one annular groove 26 of the rod 24 has overtaken the at least one seal 18. When several annular grooves 26 are provided on the rod 24, the first protective portion 42 and the second protective portion 52 are maintained inside the cavity 12 until the annular groove 26 closest to the handle 22 has overtaken each seal 18. Then, the friction between the at least one seal 18 and the at least one annular groove 26 is avoided by means of the first and the second protective portions 42, 52.

When each annular groove 26 has overtaken each seal 18, the first and the second protective portions 42, 52 are extracted from the cavity 12. For extracting the first and the second protective portions 42, 52, a pull force is applied to the first and the second handles 41, 51. Advantageously, since the perimeters of the first and the second protective portions 42 are smaller than half the perimeter of the rod 24, at least one space (not shown) remains between the first protective portion 42 and the second protective portion 52 when the rod 24 is inserted in the cavity 12. The space allows the first tool 40 and the second tool 50 to be rotated around the longitudinal direction A. A swinging movement of the first tool 40 and the second tool 50 around the longitudinal direction A while applying the pull force to the first and the second handles 41, 50 facilitates the extraction of the first and the second protective portions 42, 52.

Once the first and the second protective portions 42, 52 are out of the cavity 12, the shaft 20 can be pushed until the final position inside the cavity 12.

Since the first and the second protective portions 42, 52 are thin, the at least one seal 18 is able to recover the initial internal diameter when the first and the second protective portions 42, 52 are extracted from the cavity 12.

Finally, having a first tool 40 and a second tool 50 allows that the extraction of the first and the second protective portions 42, 52 is not blocked because of the handle 22 of the shaft 20.

LIST OF REFERENCES

A longitudinal direction of the cavity
B1 first longitudinal direction
B2 second longitudinal direction
D1 diameter of the substantially circular cross-section of the cavity
L1 width of the first large part
L2 width of the second large part
N1 width of the first narrow part
N2 width of the second narrow part
t1 first thickness
t2 second thickness
α1 first angle
α2 second angle
X1 first length X2 second length
10 transfer fuel pump
12 cavity
13 lateral wall of the cavity
14 stop ring
16 cotter
18 seal
20 shaft
22 handle of the shaft
24 rod of the shaft
26 annular groove
28 longitudinal groove
30 kit
40 first tool of the kit
41 first handle
42 first protective portion
43 first link portion
44 first large part
45 first narrow part
46 first notch
47 first flat surface
50 second tool of the kit
51 second handle
52 second protective portion
53 second link portion
54 second large part
55 second narrow part
56 second notch
57 second flat surface

The invention claimed is:

1. A kit for protecting at least one seal installed in a cavity of a transfer fuel pump, the cavity comprising an opening for receiving a shaft inside said cavity, the kit comprising a first tool and a second tool,
   the first tool comprising a first handle and a first protective portion,
   the second tool comprising a second handle and a second protective portion,
   the first and the second protective portions being shaped to be inserted in the cavity of the transfer fuel pump while receiving the shaft inside said cavity,
   the first protective portion and the second protective portion each having a substantially semi-cylindrical shape,
   the first tool and the second tool being separate and not connected to one another, and
   the first tool and the second tool being structurally equivalent.

2. The kit of claim 1, wherein a first length of the first protective portion and a second length of the second protective portion are configured to cover the at least one seal when the first and the second protective portions are inserted in the cavity.

3. The kit of claim 1, wherein a first thickness of the first protective portion and a second thickness of the second protective portion are comprised in a range from 0.1 mm to 1.5 mm.

4. The kit of claim 1, wherein the first protective portion comprises a first flat surface and the second protective portion comprises a second flat surface.

5. The kit of claim 4, wherein the first tool further comprises a first link portion, the first link portion being provided between the first handle and the first protective portion, and the second tool further comprises a second link portion, the second link portion being provided between the second handle and the second protective portion.

6. The kit of claim 5, wherein an end of the first flat surface is in an extension of the first link portion, the first flat surface being substantially perpendicular to the first link portion, and the second flat surface is in an extension of the second link portion, the second flat surface being substantially perpendicular to the second link portion.

7. The kit of claim 5, wherein the first link portion is integrally formed with the first handle and the first protective portion, and the second link portion is integrally formed with the second handle and the second protective portion.

8. The kit of claim 1, wherein the first tool and the second tool are made of steel.

9. A method for protecting at least one seal installed in a cavity of a transfer fuel pump with the kit of claim 1, the cavity comprising an opening for receiving a shaft inside said cavity, the shaft comprising at least one annular groove, the method comprising the steps of:
   a) introducing the first protective portion and the second protective portion in the cavity;
   b) inserting the shaft inside the cavity until the at least one annular groove overtakes the at least one seal;
   c) applying a pulling force to the first handle of the first tool and to the second handle of the second tool until extraction of the first protective portion and the second protective portion from the cavity; and
   d) during step c) applying a swinging movement to the first tool and the second tool.

10. The method of claim 9, wherein the introduction of the first protective portion and the second protective portion inside the cavity increases an initial internal diameter of the at least one seal.

11. The method of claim 9, wherein the first protective portion and the second protective portion cover the at least one seal while inserting the shaft inside the cavity.

* * * * *